(No Model.)
H. J. DURGIN.
SLIDE FOR EXTENSION TABLES.
No. 11,781 Reissued May 4, 1897
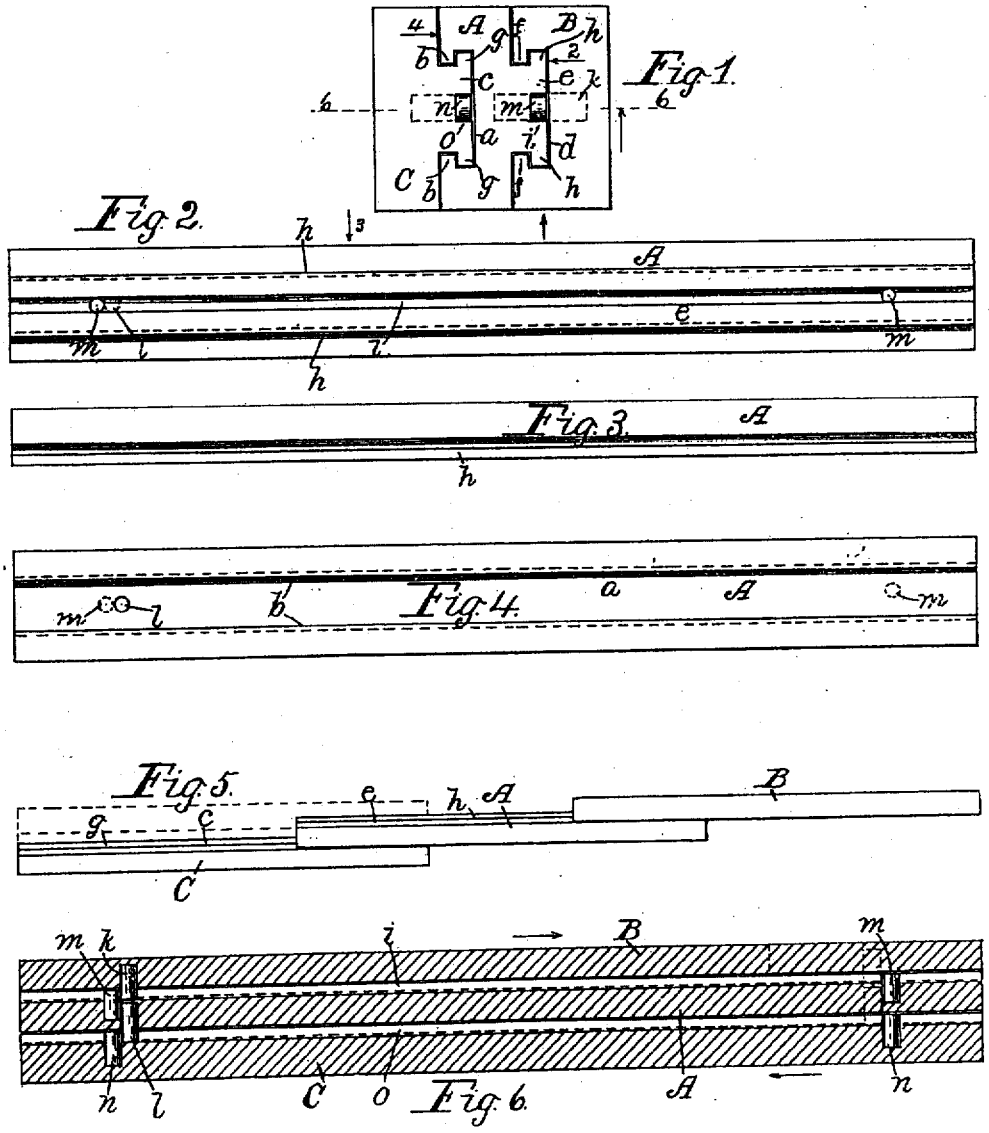
Attest:
M. L. Winston.
H. C. Ketzel.
Inventor:
H. J. Durgin,
By E. B. Whitmore,
Atty.
THE NORRIS PETERS CO., PHOTO-LITHO., WASHINGTON, D. C.

UNITED STATES PATENT OFFICE.

HENRY J. DURGIN, OF ROCHESTER, NEW YORK.

SLIDE FOR EXTENSION-TABLES.

SPECIFICATION forming part of Reissued Letters Patent No. 11,781, dated October 31, 1899.

Original No. 581,956, dated May 4, 1897. Application for reissue filed August 18, 1897. Serial No. 648,715.

*To all whom it may concern:*

Be it known that I, HENRY J. DURGIN, of Rochester, in the county of Monroe and State of New York, have invented a new and useful Improvement in Slides for Extension-Tables, which improvement is fully set forth in the following specification and shown in the accompanying drawings.

My invention relates to slides for extension-tables employed for the purpose of lengthening or shortening the tables. These slides are usually made of wood in two or more pieces and joined side by side, so as to slide freely upon each other in longitudinal directions.

The object of my invention is to produce a table-slide similar in form to those in common use, but one that may be more cheaply manufactured and stronger and more durable. This I accomplish by abandoning all short slide-pieces of either wood or metal in its construction, thus avoiding cost and also the cutting away of the material of the slide in a manner to render it weak, and by providing a continuous and unbroken bearing between the parts in contact to the extent to which they may at any time overlap. Furthermore, in constructing these slides I form no slots or openings through them terminated by end walls, such openings being costly to form on account of the method necessary to produce them. The grooves or channels formed in the slides herein shown are continuous from end to end of the pieces, on account of which the latter may be run in rapid succession under the cutting-tool, there being no stopping of the work or returning of the parts across the tool to complete said grooves or channels.

The invention is hereinafter more fully described, and particularly pointed out in the claims.

Referring to the drawings, Figure 1 is an end view of the slide. Fig. 2 is a plan of the middle piece, view indicated by arrow 2 in Fig. 1. Fig. 3 is an edge view of the middle piece, indicated by arrow 3 in Fig. 2. Fig. 4 is a plan view of the middle piece, indicated by arrow 4 in Fig. 1. Fig. 5 shows the slide as a whole, partly drawn out. Fig. 6 is a longitudinal section of the slide, taken on the dotted line 6 6 in Fig. 1. Fig. 1 is drawn to a scale larger, and Fig. 5 to a scale smaller, than that of the other figures.

Referring to the drawings, A B C are the three main parts of the slide, they being of the same width and length and preferably made of wood. The middle part A is made with a longitudinal groove or channel *a* in one side, with overhanging lips or gibs *b*, the groove being uniform in cross-section and extending from end to end of the part. The contiguous outside part C is formed with a T-shaped tongue or male part *c* along one side thereof, adapted to fit freely in the groove *a* of the part A, as shown. This tongue *c* is a portion of the part C itself (and not a separate piece inserted in a channel formed in the part C) and extends continuously and unbroken from end to end of the part C. From this description of the parts A C it will be understood that the bearing between them is at all times continuous as to longitudinal directions to the extent to which they lap upon each other.

The part B is formed with a groove or channel *d* similar to the groove *a* in the part A, the latter part having a tongue *e* to fit the groove. This tongue *e* and the groove *d* are uniform in cross-section and continuous from end to end of the respective parts, so that the bearing between them at any time will be continuous and unbroken to the extent to which they lap upon each other, the same as in the case of the parts A C, above described. The tongue *e* is a solid part of the piece A and not a separate piece inserted therein. The tongues *c* and *e* are provided, respectively, with two lips or projections *g g* and *h h*, which fit within the undercut portions of the grooves *a* and *d* and prevent the parts from being separated except by endwise movement. On account of making these several tongues and grooves continuous from end to end of the respective parts of the slide long bearing-surfaces between them are secured, and by forming the male portions or tongues of the parts A C of the slide directly upon or from the parts themselves I avoid cutting into said parts in a manner to weaken them. This gives greater strength to those parts and renders them much less liable to split than if they were cut into to receive separate male pieces or tongues.

The tongue *e* is provided with a narrow longitudinal groove *i*, extending from end to end of the part A. This part is provided with stops *m m*, extending into the groove to intercept a pin *k*, rigid in the part B and occupying the groove between the stops *m m*, Fig. 6. On account of this construction of the device the longitudinal movements of the part B upon the part A are limited by the pin *k* encountering one or the other of the stops *m m* and the parts are prevented from becoming separated or detached.

The tongue or male piece *c* of the part C is similarly formed with a groove *o*, extending the full length of the part, the latter being provided with stops *n n*, extending into said groove. The adjacent part A is provided with a pin *l*, reaching into the groove between the stops *n n*, which serves to limit the longitudinal motions of the parts A C upon each other, said parts being prevented from becoming separated.

It will be observed that the stop-pins *m m*, held by the part A, although projecting into the groove *i* in said part, do not extend beyond the plane of the outer face of said part, and also that the stop-pins *n n*, held by the part C to occupy the groove *o* in said part, do not extend beyond the plane of the outer face of said part C—that is to say, the part A holds stop-pins to project into its own groove *i* and the part C holds stop-pins to project into its own groove *o*, said stop-pins *m m* and *n n* projecting through the bottoms of said respective grooves into the latter instead of from without or from adjacent parts into said grooves *i* and *o*. This construction permits of the use of wooden pins, which are much cheaper than metal and which may be driven into holes into the slide-sections without danger of their being broken off by accident in use or transportation.

There may be two or more parts A B C taken to form the slide, but two, a male and a female part, are necessary, the number above two not being essential to my invention.

What I claim as my invention is—

1. A slide extension comprising a plurality of strips having respectively, interlocking grooves and projections, the adjacent edge of one strip having a guiding-groove and the adjacent edge of the other strip having a pin traversing the groove, and stop-pins disposed parallel with the guiding-pins, the outer ends of all of the pins terminating even with or below the surface of the strip in which they are secured, as set forth.

2. A slide extension comprising a plurality of relatively movable strips provided relatively with a continuous longitudinal groove having undercut walls and a continuous longitudinal tongue fitted to work in said groove, the face of the tongue being provided with a continuous longitudinal groove, traversing pins in the undercut grooves and stop-pins secured in the grooves of the tongues parallel with the said traversing pins to be engaged thereby, the outer ends of all of the pins terminating even with or below the surface of the part in which they are secured, as and for the purpose specified.

3. In a device of the character described, the combination of three slides the center one being provided with a groove on one face and a tongue on the other, another slide having a groove to receive the tongue on the center slide and the other with a tongue working in the groove of the center slide, pins mounted in the center slide and projecting one from one side and the other from the other side thereof, and stop-pins having one end seated in grooves in the tongues of the slides with the other ends even with or below the surface of the part in which they are secured, the said pins being disposed parallel with the traversing pins, substantially as shown and described.

4. A table-slide consisting of a series of longitudinally-movable strips, one surface of one of the side pieces and of each of the intermediate pieces being provided with a longitudinally-undercut groove extending continuously and unbroken from one end of the strip to the other, and one surface of the other outside strip and the other side of each of the intermediate strips being provided with a T-shaped tongue, the central portion of each tongue being provided with a narrow, continuous and unbroken groove extending from one end of the strip to the other, of two stop-pins secured at a distance from each other in the groove of each tongue, and a cylindrical wooden traversing pin in the undercut groove of each strip, said traversing pin being located between the two stop-pins and parallel therewith and adapted to engage therewith and limit the movement of the strips upon each other, the outer end of each of the pins being even with or below the surface of the piece to which it is secured, substantially as set forth.

In witness whereof I have hereunto set my hand this 31st day of July, 1897, in the presence of two subscribing witnesses.

HENRY J. DURGIN.

Witnesses:
ENOS B. WHITMORE,
SHERMAN O. RICHARDSON.